INVENTORS.
ESMOND P. G. WRIGHT
DONALD A. WEIR
RAYMOND C. P. HINTON
BORIS DZULA
BY Philip M. Bolton
ATTORNEY

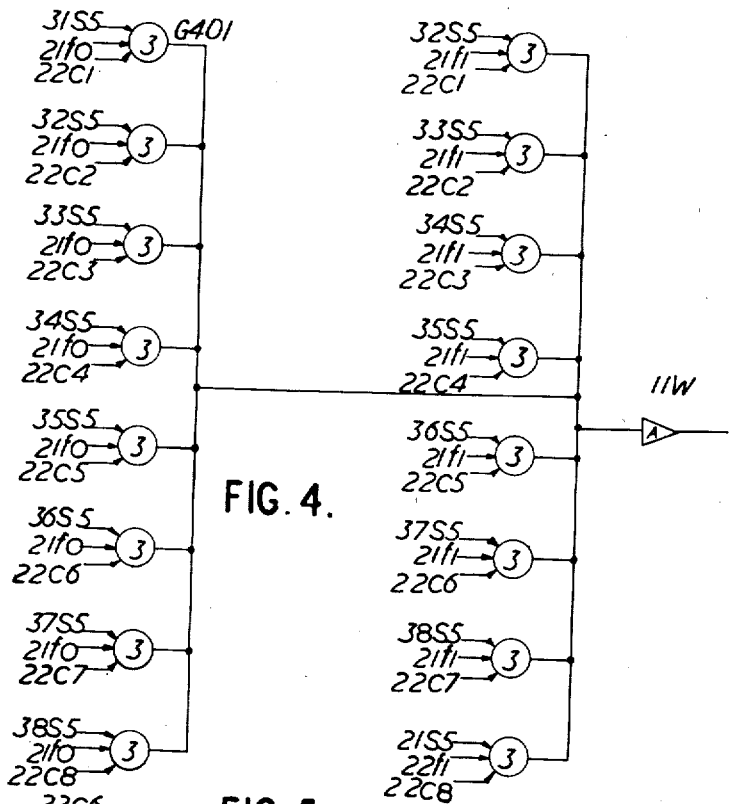
FIG. 4.
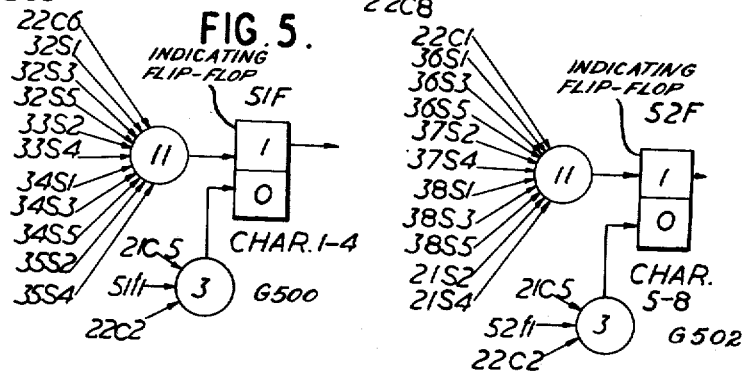
FIG. 5.
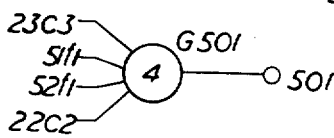

United States Patent Office 3,181,123
Patented Apr. 27, 1965

3,181,123
DATA PROCESSING SYSTEMS
Esmond Philip Goodwin Wright and Donald Adams Weir, London, England, and Raymond Cecil Price Hinton, Teaneck, and Boris Dzula, Clifton, N.J., assignors to International Standard Electric Corporation, New York, N.Y.
Filed Feb. 5, 1959, Ser. No. 791,498
Claims priority, application Great Britain, Feb. 6, 1958, 3,993/58
6 Claims. (Cl. 340—172.5)

This invention relates to data processing systems, such as are used in electronic computers, electronic storage telegraph systems, and the like.

In so-called "electronic" systems of this type, the processing of an instruction or a message through the system takes place largely or wholly by electrical processes which involve no mechanical movement (apart, in some cases, from transport of a storage medium), and storage of data, when required, is carried out by the creation of internal strains in the material of the store. Such storage media, as is now well-known, comprise cathode ray tubes, acoustic delay lines, ferrite rings or blocks, magnetic wires or tapes, magnetic drums or discs, to name but a few, and in some of the magnetic types referred to, "transport," or movement, of the medium must be provided.

An object of the present invention is to provide a processing device, common to a number of signalling channels in a data processing system, and able to serve all the channels concerned in turn by a relatively rapid speed of operation on a time-sharing basis.

According to the present invention, a data processing system is provided which comprises a plurality of signal channels, stores individually associated, one with each said signal channel, signal transfer equipment for continuously transferring signals traversing said channels to said respective stores, so as to feed a constantly-changing, constant length signal combination, constituted at any moment by the last sequence of signals of said constant length on a channel, into each said store during signal transmission on the respective signal channels, means for examining the current contents of each of said stores for at least one predetermined signal combination, and means for giving a signal relating to the corresponding signal channel when a predetermined signal combination is detected in a store.

In this invention, a "constantly-changing, constant length signal combination" might be constituted by, say, the last eight characters fully received in a channel, and subject, therefore, to constant modification as subsequent characters ("signal groups") are received, while the processing function concerned can be of several types. One example would be to examine a number of consecutive characters to detect a predetermined combination which may have the significance of "message start," "message end," "interrupt message," or "resume message." Another form of processing would involve translation from one telegraph code, and as 7 unit, to another telegraph code, such as cable code. Yet another application would be the translation necessary for conversion from an error correcting code to 7 unit code or vice versa. Yet another application would relate to enciphering or deciphering of messages.

In the centre, of which the common processing equipment only is to be described, 50 telegraph channels operating at 50 bauds can be served by a common processing equipment which is associated with each of the channels in turn for a period of 1 millisecond. Conversely each channel is associated with the processing equipment once every 50 milliseconds, so that an association takes place between the scanning of the channel for the last intelligence element of each character and the scanning for the first intelligence element of the character which follows.

Evidently the savings made possible by providing one detecting circuit rather than fifty can more than offset the supply of certain auxiliary apparatus for the association function.

In general terms the arrangement can be achieved by providing each of the fifty channels with a character store and a trigger device, the latter being operated immediately after the fifth intelligence element of each character is scanned in the character store. The common detector equipment would comprise a store, such as a track of a magnetic drum holding 2,000 elements, and associated reading and writing circuits, each of which is connected with a magnetic head. The track can thus provide 40 elements storage capacity for each of the 50 channels, and it is arranged that the 40 elements associated with each telegraph channel contain a record of the last eight characters to have been received. The reading circuit extracts this information character by character and channel by channel. If an additional character has been received in the line circuit since the last association, it is added to the record, and the character which has been in store longest is discarded. When there is no new character to add, the eight characters are replaced unmodified. Each time a character is added, the last eight are scrutinised to ascertain whether they represent any of the predetermined combinations, and on recognition a signal is passed to the channel circuit to record the event. It is possible that the signal does not relate to the inward traffic but relates to the need to stop transmitting on a specified outgoing channel, and in such a case, the signal can be directed through appropriate switching circuits to the outgoing channel concerned.

The invention will be described with reference to the accompanying drawings illustrating a preferred embodiment of a telegraph switching system, and in which:

FIG. 4 is a diagram of the recording (and re-recording) circuit; and

FIG. 5 is a diagram of the character detection equipment for selected characters.

Figure 1:
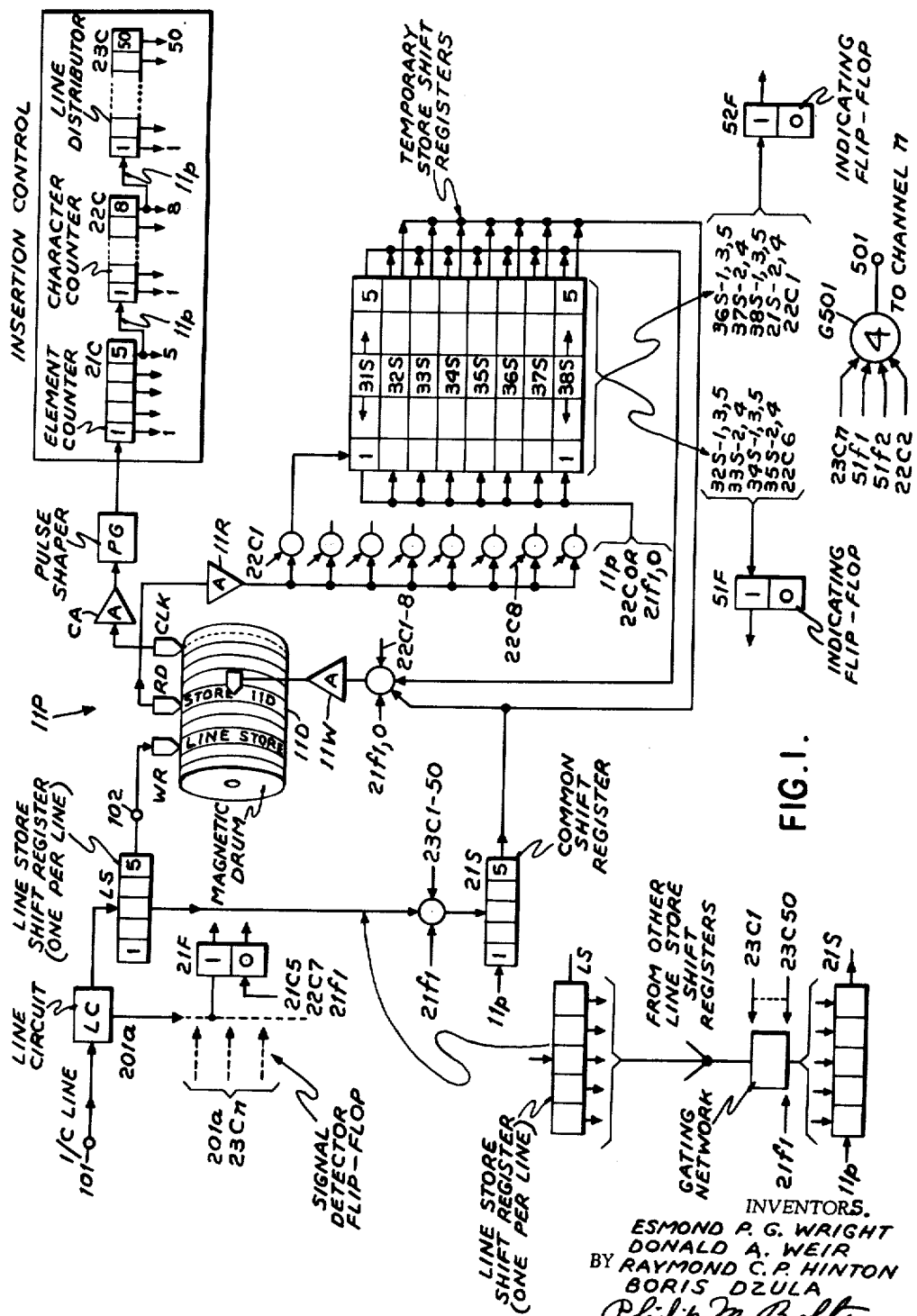
FIG. 1 is a block diagram of a system illustrating the invention.

The block diagram of FIG. 1 shows one of 50 channels, receiving intelligence from an incoming line 101, and passing intelligence forward to a terminal 102, via a storage device LS on the way. 11P is a common processing equipment associated with the 50 channels by distributor 23C shown at the right of the figure. In addition, it is associated with the track 11D of a magnetic drum by means of a reading amplifier 11R and a writing amplifier 11W. It is arranged that the distance between the two heads associated with the track 11D is so related to the drum speed that when no insertion is made, the characters read by 11R are replaced by 11W in the same element positions from which they were withdrawn. When an insertion is made, the characters are each shifted one element in the direction opposite to the direction of movement of the drum surface during the reading and writing process to make room for the new one to be added. The processor 11P includes an insertion circuit which receives a signal over 23C when there is a character to insert. When no such signal is received, it is unnecessary to check the recorded characters, and, in fact, unnecessary to re-record what is already recorded, though preferable to do so, in any practicable system.

Figure 2:
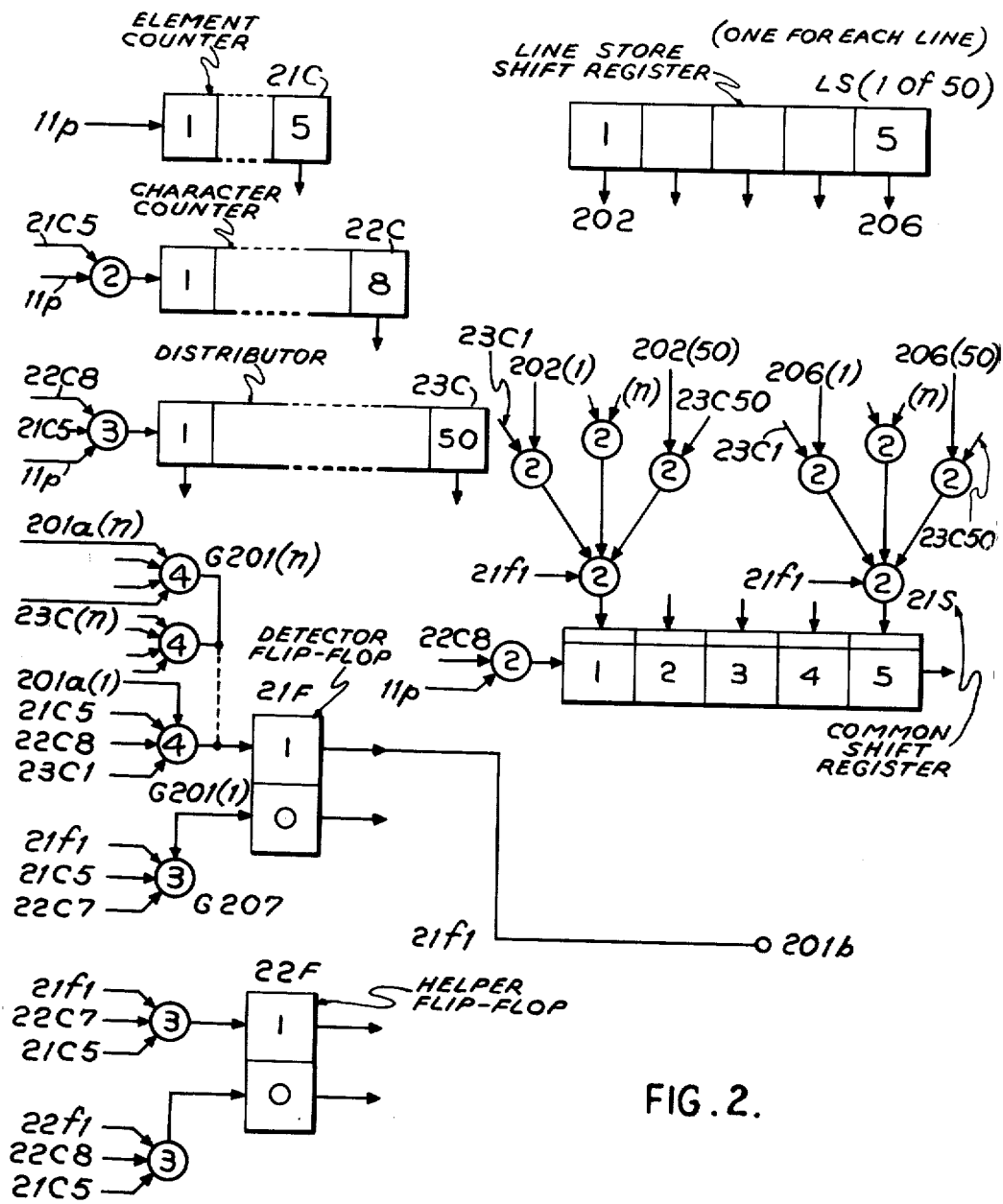
FIG. 2 is a block diagram of the addition control equipment, together with the channel distributor.

FIG. 2, which is a diagram illustrating the insertion control of the processing equipment, includes a counter 23C driven by clock pulses 11p derived from the magnetic drum to define the element positions of a character on the drum. An 8-stage counter 22C, driven by 21C in its final position by means of a coincidence gate to which the clock pulses 11p are applied as well as a potential from 21C5, operates to define the eight characters associated with each channel, and distributor 23C, which is driven by 22C and 21C in their final positions, by means of a coincidence gate to which the outputs of 21C5 and 22C8, as well as the clock pulses 11p, are applied, associates the processor 11P with the channels in turn. A trigger 21F is provided to recognize when there is a new character to add. The distributor 23C enables each channel to be examined in sequence. It has been mentioned previously that each channel has a trigger (not shown) recording when a character has just been received, and this trigger (for channel 1) provides a signal to the terminal 201a(1) which, together with potentials from 21C5, 22C8, and 23C1, opens gate G201(1) so as to cause 21f1 to conduct. It should be understood that corresponding gates (G201(2)–G201(n)) are associated with the other channels (as defined by the respective positions of 23C).

A shift register 21S is provided to receive the character just recorded from the channel concerned, each of which is also provided with a 5-position shift register LS from which a character can be transferred direct to 21S. It should be understood that the position of 23C allows transfer to take place only from the channel with which it is temporarily associated, via the appropriate group n of the leads 202(n) to 206(n), where n is any one of the fifty channels. When 21f1 conducts, it applies a signal to the terminal 201b which is extended in conjunction with 23C to prepare the resetting of the channel trigger announcing a character to be added. The trigger 22F aids 21F, as will be described later.

Although an individual line circuit has not been shown, reference may be made to U.S. Patent No. 2,932,688, issued April 12, 1960, for a complete description, which deals with just this problem of receiving telegraph information from a line circuit, staticising it character by character on the pattern movement register (LS), and energising a trigger to indicate the reception of each character. In the said prior specification, R1, FIG. 2, is the register and F4, FIG. 4, the trigger, and R1 could well be identified with shift register 21S of the present disclosure (if the 0 section of R1 is ignored), or could be arranged as shift register LS to feed shift register 21S, via the appropriate n group of leads 202–206. The terminals 201a would be identified with f4.1 of the said trigger F4.

It will be appreciated that the speed of reading from the drum track and of rewriting is far greater than the arrival of new characters on the individual lines, so that it may fairly be assumed that for the duration of association of any one channel n with the processing equipment, i.e. during one position of 23C, static conditions will be found on terminal 201a(n) and on terminals 202(n)–206(n) (feeding 21S via gates G202–G206), and the condition of 21F will be determined accordingly. It will be understood that the *effective* association for any one channel is during the inter-character pause, between the receipt of the last element of the character and the first element of the next, a period of about 70 ms. Thus, 21F will either remain in position 0, or be conditioned to position 1 by a coincidence on G201(n) between a signal on 201a(n) and signals from 21C, 22C and 23C, at the end of a cycle of 22C, just before 23C is advanced to its next distributor position. However, it is important to bear in mind that what is read from the drum in one cycle of 22C (one specified position of 23C) is not rewritten until the next cycle, since the heads are eight character positions apart and the pattern register holds the eight characters at any moment all from one channel, or divided between two channels according to the position of the cycle, the insertion of a character element at one end causing an element to be displaced from the other end of the pattern register to the writing head. Consequently, trigger 21F must retain a record of the availability of a character from the channel with which 11P was last associated and from which it obtained the character stored in 21S ready for insertion in the information being rewritten.

Thus, the state of the triggers in FIG. 2 is that appropriate for writing information corresponding to the previously associated channel, the reading of which has already taken place in the previous position of 23C.

Considering 21F, it will be seen that, from the end of period 22C7, it is inevitably in position 0 (by virtue of 21f1 on G207), and inevitably remains there until the end of period 22C8 (since the operation of 21F to condition 1 depends on 21C5 and 22C8), just before 23C changes to a new position, and 21F will be now conditioned accordingly in that last instant of time (before 21C5 goes to 21C1, 22C8 goes to 22C1, and 23C goes to its next position), either for writing in a new character (21f1 condition) or for re-recording (21f0 condition) the information corresponding to that channel in the time position of the next channel. A new character due to be written in during the next cycle of 22C is introduced into 21S at the end of the last cycle when 21F was controlled and is driven out of 21S at 21S5 during 22C8 of this next cycle, as will be referred to again in due course.

Figure 3:
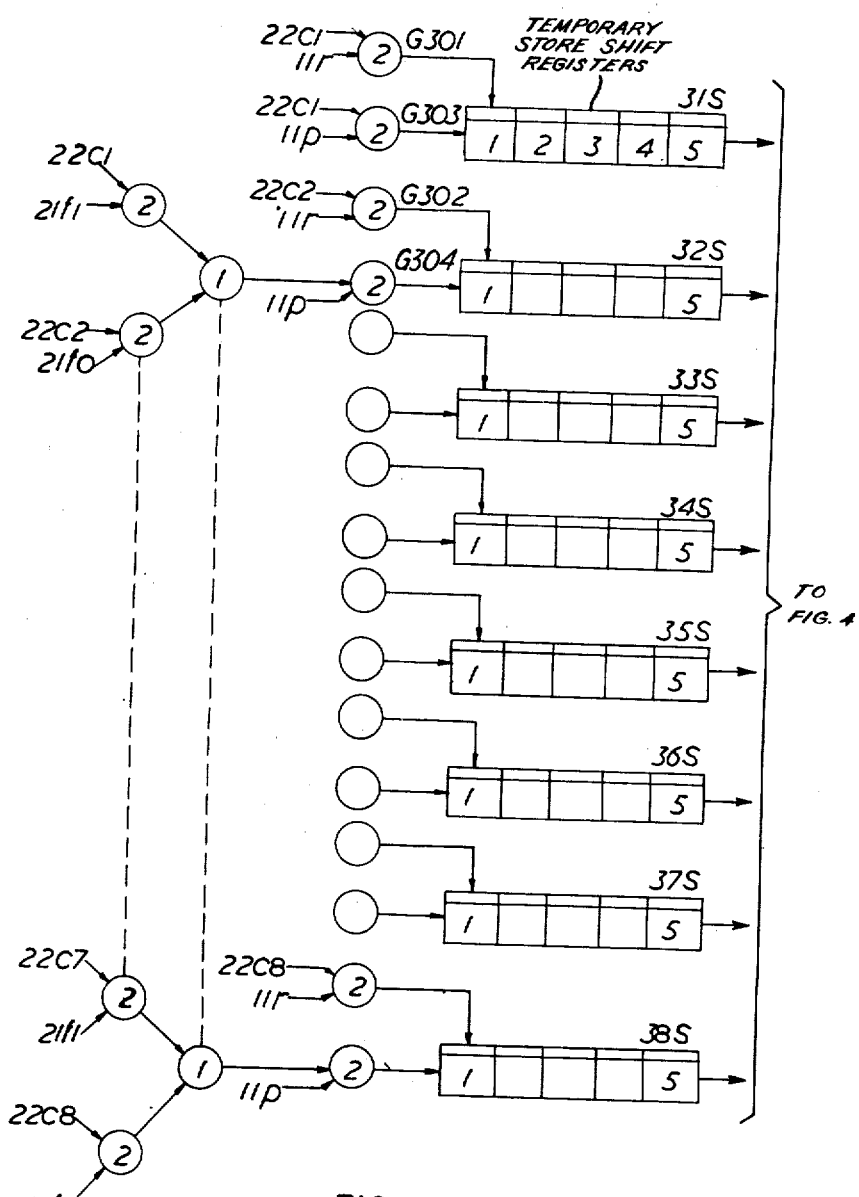
FIG. 3 is a diagram of the reading circuit and temporary character stores.

FIG. 3 shows the reading circuit and includes shift registers 31S–38S. The elements read by the reading amplifier 11R are applied progressively to these registers under the control of the counter 22C at gates G301, 302 etc. As the intelligence is applied to the shift registers, stepping pulses are applied also under control of 22C, via gates G303, 304 etc. It will be observed that the stepping pulses are applied to 31S in position 22C1 only, but that for each of registers 32S . . . 38S, stepping pulses are applied in two positions of 22C. The earlier of these two positions has no bearing on input and will be described in connection with FIG. 4. The eight characters read in one cycle are written into 31S . . . 38S in time positions 22C1 . . . 22C8. By the time 38S is filled, 22C and 21C are at the ends of their cycles, and at the next 11p pulse, both will be returned to position 1, and 23C advanced to its next position.

The beginning of the portion of drum track which has just been read is now under the writing head, and the position of 23C corresponds to the channel which corresponds to the next portion of drum track to be read.

FIG. 4 is concerned entirely with the re-writing of the intelligence via the writing amplifier 11W, together with insertion of new characters. For explanatory purposes two columns of gates are shown. The left hand column G401 . . . concerns the condition when there is no new character to insert (21F at 21f0) and the existing eight characters are returned while the counter 22C steps from 1 to 8. It will be evident that as the contents of each shift register is being passed to the writing amplifier, a new character is being read via 11R FIG. 1 to take its place, the incoming and outgoing gates for each register, e.g. G301, 303, and G401 being controlled by the same position (e.g. 22C1) of 22C. Thus, as the first character of one set is pulsed out of the pattern register at the end 5, element by element, to the drum, it is replaced, element by element, at the entrance 1 by the first character of the next set, and so on. The new character will be associated with the following channel as indicated by 23C.

When a new character is being inserted and 21f1 is conducting, the right hand column of gates in FIG. 4 is effective. With these gates, the contents of 32S–38S and 21S are recorded, the contents of 31S being discarded. It is for this reason that the shift registers 32S-38S are each driven in two positions of 22C. The earlier position is used for extraction and in the following cycle the newly read character is inserted. It will be seen that in these circumstances the first character of the new set will be received on 31S from the drum, at the same time that the character from 32S is being transmitted to the drum as the first character of the previous set, and so on.

In order to allow 21F to reset at the termination of 22C7 and to be free to re-operate for the next channel, in accordance with the condition of 201a, the trigger 22F is used to control the recording of the last character, taking over the function of 21f1 at the end of 22C7, and being restored at the end of 22C8.

FIG. 5 gives an example of a detector which might be used to record a particular combination or set of combinations of eight predetermined characters, for an arbitrary channel defined by 23C3.

It should be noted that, for the example shown below, the detection made is not exclusive, since alternate elements of the characters are ignored. Clearly, for detecting a single combination all elements must be individually examined, either for giving positive controls (as in FIG. 5), or inhibitory controls in which the *absence* of the correct elements exerts a positive inhibitory control on the output to terminal 501. Such an arrangement is not shown, but is well-known to those skilled in the art.

The triggers 51F, 52F, examine alternate elements of the characters taken in sets of 4. It is desired to make the examination as soon as the last character has been received from the channel, so that this character will be in 21S. Since reception and retransmission are continuing operations, it is desirable to make the examination in two parts. Hence, 51F and 52F are set to position 0 at the end of period 22C2, via gates G500, 502, and the first four characters are examined in period 22C6, after they have been completely staticised in 32S–35S, 51F triggering to position 1 if the sought-for conditions are found. Similarly, when the next four characters are on 36S–38S and 21S, 52F operates to position 1 at time 22C1 of the next cycle if, again, the sought-for conditions are found. If both 51f1 and 52f1 conduct, a signal is passed during 22C2 to the terminal 501, via G501 in the position of 23C corresponding to the appropriate channel for which the eight-character combination is detected.

It will be evident that other pairs of triggers, such as 51F and 52F, can be added to detect other character combinations, or each can be used to detect and to signal a different signal combination, a separate gate, such as G501, being provided for each trigger. It will be evident that the output of such triggers can be used for any desired purpose.

Similarly, it is equally possible to allow the triggers, such as 51F, etc., to be used for translation purposes, the translated character combination being returned to the incoming channel for storage and retransmission or elsewhere as needs be.

The arrangement described illustrates only an example, and it should be understood that the processing carried out to a character or a plurality of characters can take many forms. Similarly, for the indicator detection, it should be understood that a variety of combinations of various length can be handled by the common circuit of all the channels with which it is associated from time to time.

While the principles of the invention have been described above in connection with specific embodiments, and particular modifications thereof, it is to be clearly understood that this description is made only by way of example and not as a limitation on the scope of the invention.

What we claim is:

1. A data-processing system comprising a plurality of signal channels each having combinations of signal characters appearing thereon, a plurality of individual channel stores for respective signal channels, each having a predetermined number of character positions, means common to all said channels and responsive to the appearance of a signal character on any channel for shifting the characters recorded in the store of that channel one character position to discard the earliest recorded character, signal character transfer equipment, common to all said channels, means common to all said channels and responsive to the appearance of a signal character on any channel for operating the said transfer equipment to transfer said character from the channel to the character position in its respective store vacated by the operation of said shifting means, examining means for examining the said stores each time a character is added to detect a predetermined one of said combinations of signal characters, and means controlled by the detecting of said predetermined combination for providing a signal indication.

2. A data-processing system, as set forth in claim 1, wherein the shifting means includes a temporary store and associated temporary store transfer means for transferring signal combinations stored in said channel stores to said temporary store for examination by said examining means, means for modifying said transferred signal combination by deleting the first stored character in a signal combination and by adding the last stored character to said combination, and means for returning the examined and modified signal combinations to their respective stores.

3. A data processing system, as set forth in claim 2, in which the examining means comprises at least one coincident gate having a plurality of inputs connected to predetermined individual elemental positions of the temporary store, the signal indication appearing on the output of said gate when the predetermined one of the combination of characters is present in the temporary store.

4. A data processing system, as claimed in claim 1, and in which the said individual stores together constitute a single continuous type of storage medium divided into contiguous sections individual to the said number of channels.

5. A data processing system, as claimed in claim 4, and in which the said storage medium comprises a movable magnetic medium provided with a reading head and a writing head, spaced apart a distance equal to the length of one of said individual stores, and in which the character transfer equipment comprises timing equipment synchronously under the control of timing signals derived from the storage medium and means for inserting signals transferred to these stores into the said storage medium by the said writing heat at times determined cyclically by said timing equipment.

6. A data processing system comprising a plurality of signal channels each having combinations of signal characters appearing thereon, a plurality of individual channel stores for respective signal channels, each having a predetermined number of character positions, means responsive to the appearance of a signal character on any channel for shifting the characters recorded in the store of that channel one character position to discard the earliest recorded character, signal character transfer equipment, means responsive to the appearance of a signal character on any channel for operating the said transfer equipment to transfer said character from the channel to the character position in its respective store vacated by the operation of said shifting means, examining means for examining the said stores each time a character is added to detect a predetermined one of said combinations of said characters, and means controlled by the detecting of said predetermined combination for providing a signal indication, said transfer equipment including a buffer store for recording in sequence the single signal combinations for the said channels as such signal combinations appear on said channels, and means in said transfer equipment responsive to the recordation of a signal combination in said buffer store for substituting the last said signal combination in the individual store for the oldest signal combination stored therein.

References Cited by the Examiner
UNITED STATES PATENTS
2,764,634 9/56 Brooks _____ 340—174
2,968,791 1/61 Johnson _____ 340—172.5
3,061,192 10/62 Terzian _____ 340—172.5

MALCOLM A. MORRISON, *Primary Examiner.*

IRVING L. SRAGOW, EVERETT R. REYNOLDS,
*Examiners.*